US006276602B1

(12) United States Patent
Henderson et al.

(10) Patent No.: US 6,276,602 B1
(45) Date of Patent: Aug. 21, 2001

(54) MODULAR SELF SERVICE TERMINAL

(75) Inventors: Jim Henderson, Fife; Timothy Wiggins, Perth, both of (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/259,084

(22) Filed: Feb. 26, 1999

(30) Foreign Application Priority Data

May 23, 1998 (GB) ........................ 9811069

(51) Int. Cl.[7] ........................ G06F 17/60

(52) U.S. Cl. ........................ 235/379; 235/444

(58) Field of Search ........................ 235/379, 380, 235/381, 382, 441, 444, 453

(56) References Cited

U.S. PATENT DOCUMENTS

| | | | | |
|---|---|---|---|---|
| 4,134,537 | | 1/1979 | Glaser et al. | 235/379 |
| 4,355,369 | | 10/1982 | Garvin | 364/900 |
| 4,813,475 | | 3/1989 | Couvrette | 165/21 |
| 5,233,167 | * | 8/1993 | Markman et al. | 235/375 |
| 5,249,103 | * | 9/1993 | Forsythe | 361/730 |
| 5,553,376 | * | 9/1996 | Solanki et al. | 29/833 |
| 5,808,283 | * | 9/1998 | Stanton et al. | 235/441 |
| 6,027,019 | * | 2/2000 | Kou | 235/375 |
| 6,193,152 | * | 2/2001 | Fernando et al. | 235/380 |

FOREIGN PATENT DOCUMENTS

| | | |
|---|---|---|
| 0375884 | 7/1990 | (EP) . |
| 2025106 | 1/1980 | (GB) . |
| 2203880 | 10/1988 | (GB) . |
| 9729444 | 8/1997 | (WO) . |

OTHER PUBLICATIONS

"Automatic Transaction Facility", IBM Technical Disclosure Bulletin, vol. 28, No. 3, Aug. 1985, p. 1032, XP–002058709.

* cited by examiner

*Primary Examiner*—Karl D. Frech
*Assistant Examiner*—Daniel St. Cyr
(74) *Attorney, Agent, or Firm*—Francis L. Conte

(57) ABSTRACT

A terminal in the form of an automated teller machine (ATM) comprises a base unit 30 with additional add-on modules. These include a depository/dispenser 31, a statement printer 32 and secondary dispenser unit 33. The base unit has a card reader 40, keypad 42 and display 44 to allow cash to be dispensed. The add-on units are attached to the base unit which base unit provides environmental control as well as a processor control and power sourcing.

20 Claims, 4 Drawing Sheets

MODULAR FREE – STANDING ATM MODULE ATTACHMENT

MODULAR FREE – STANDING ATM MODULE ATTACHMENT

MODULAR SELF SERVICE TERMINAL

BACKGROUND OF THE INVENTION

The invention relates to a self service terminal, for example, an automated teller machine (ATM).

In such machines a single cabinet contains all the device requirements resulting in a relatively large and inflexible arrangement.

SUMMARY OF THE INVENTION

The present invention is concerned with providing a more flexible arrangement.

According to the invention there is provided a self service terminal having a housing and dispensing means for dispensing at least one item in response to an authorized user request characterized in that the housing and the dispensing means form a base unit and interfacing means are providing on the base unit to receive at least one modular add-on unit to provide additional facilities thereto.

Further according to the invention there is provided a self service terminal having a housing arrangement, authorizing means and dispensing means for dispensing at least one item in response to an authorized user request, characterized in that the housing arrangement comprises a plurality of abutting modular units each having a separate housing, the authorizing and dispensing means forming a base unit.

Still further according to the invention there is provided a method of operating a self service terminal characterized by or comprising providing a base unit for dispensing at least one item in response to an authorized user request and providing at least one additional add-on modular unit to provide additional facilities thereto.

BRIEF DESCRIPTION OF THE DRAWINGS

In the accompanying drawings

Figure 3:
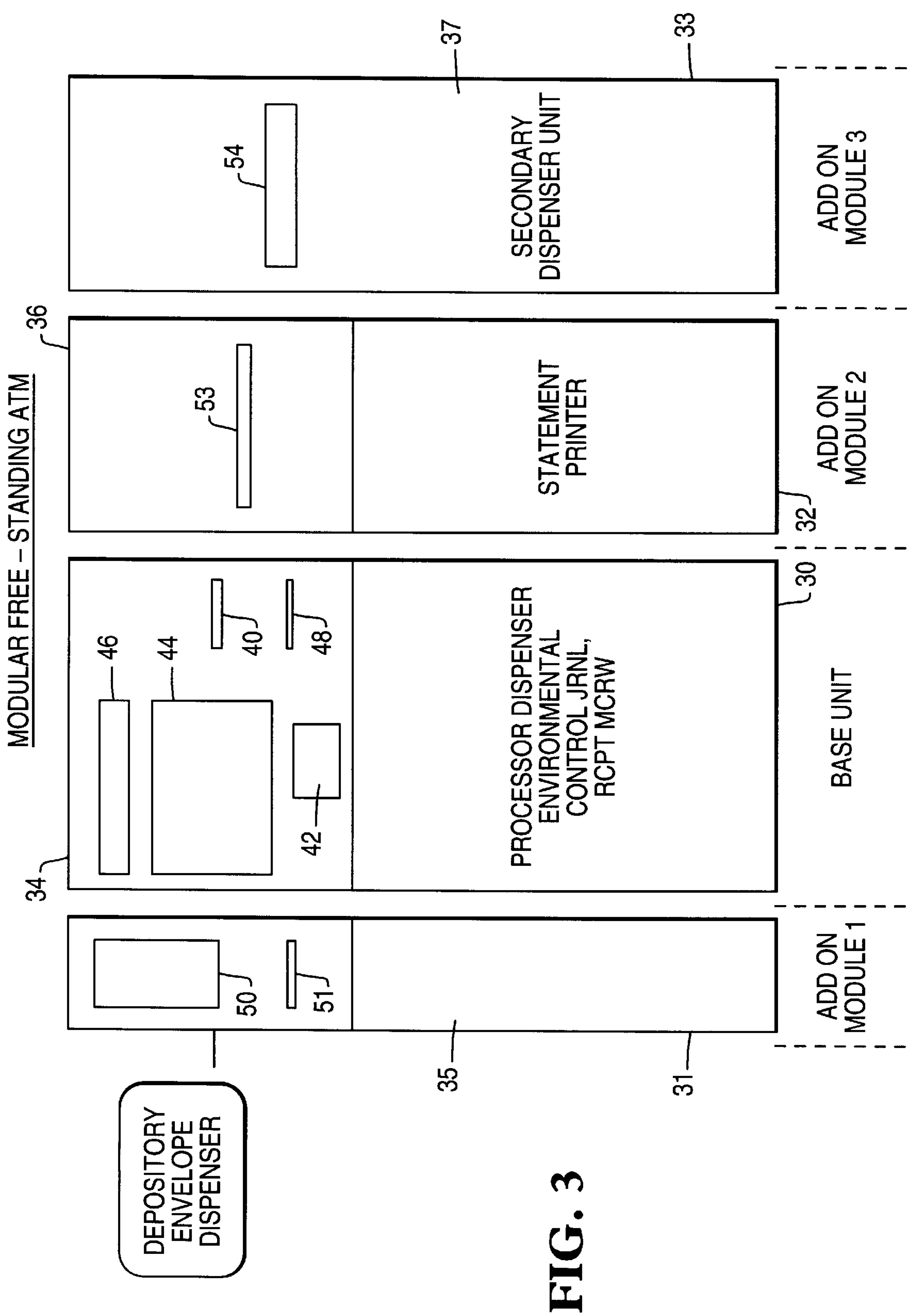
Figure 4:
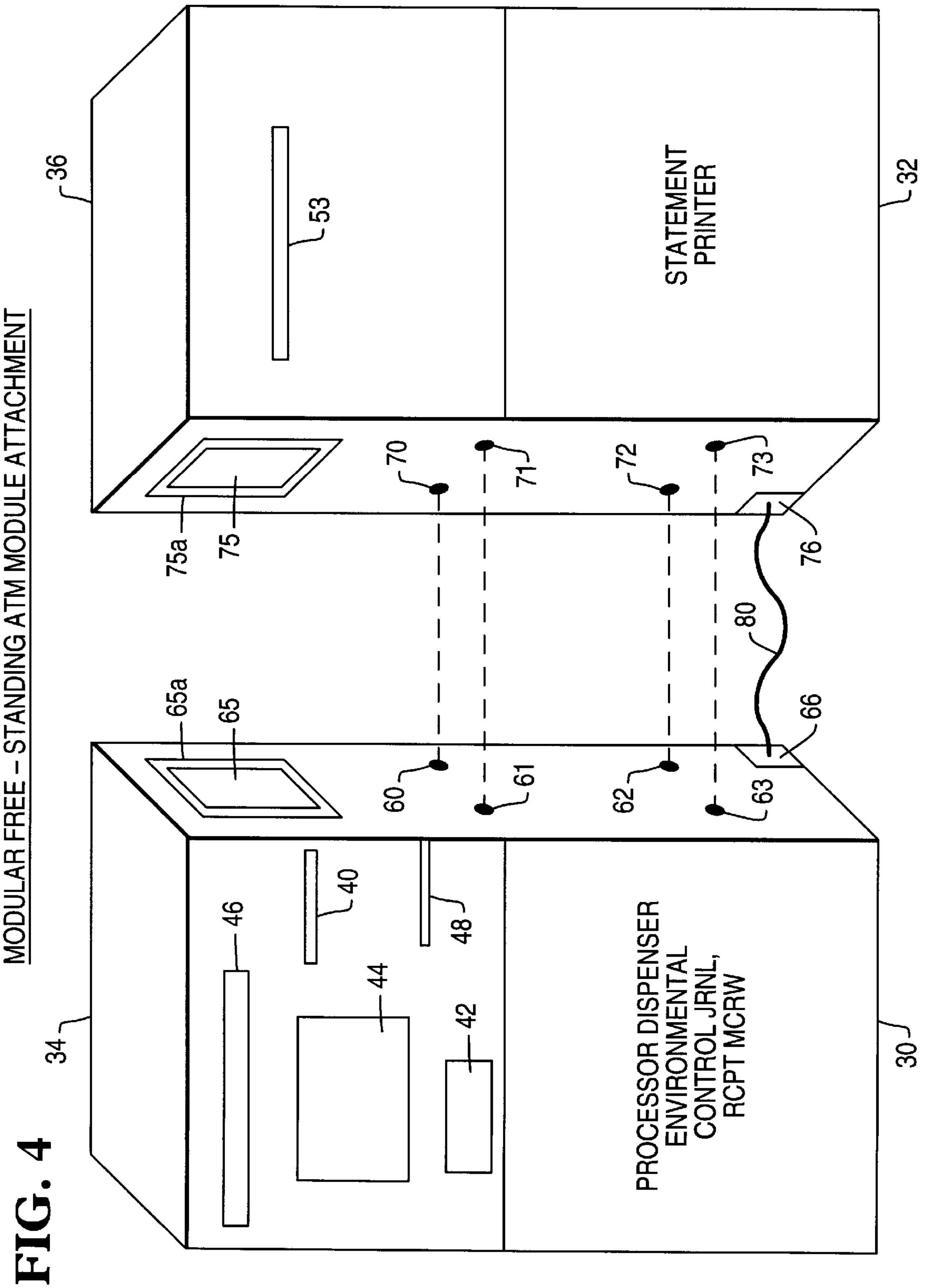
Figure 5:
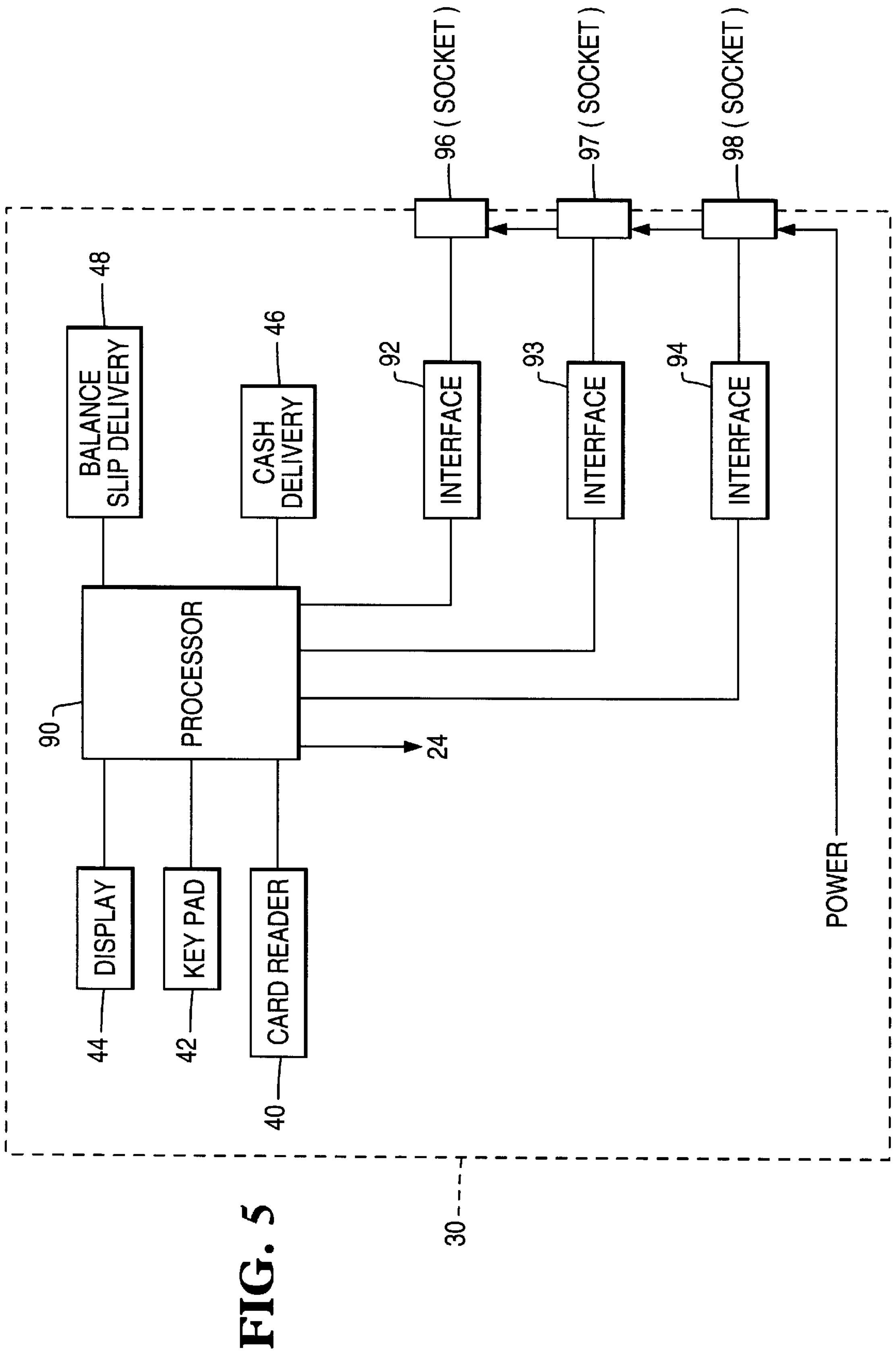

The invention will be described by way of example with reference to:

FIG. 3, which shows the inventive configuration with a plurality of modular units;

FIG. 4, which shows in more detail the linkage between the main unit and an auxiliary unit; and FIG. 5, which shows the control system for the FIG. 3 arrangement.

DETAILED DESCRIPTION

Figure 1:
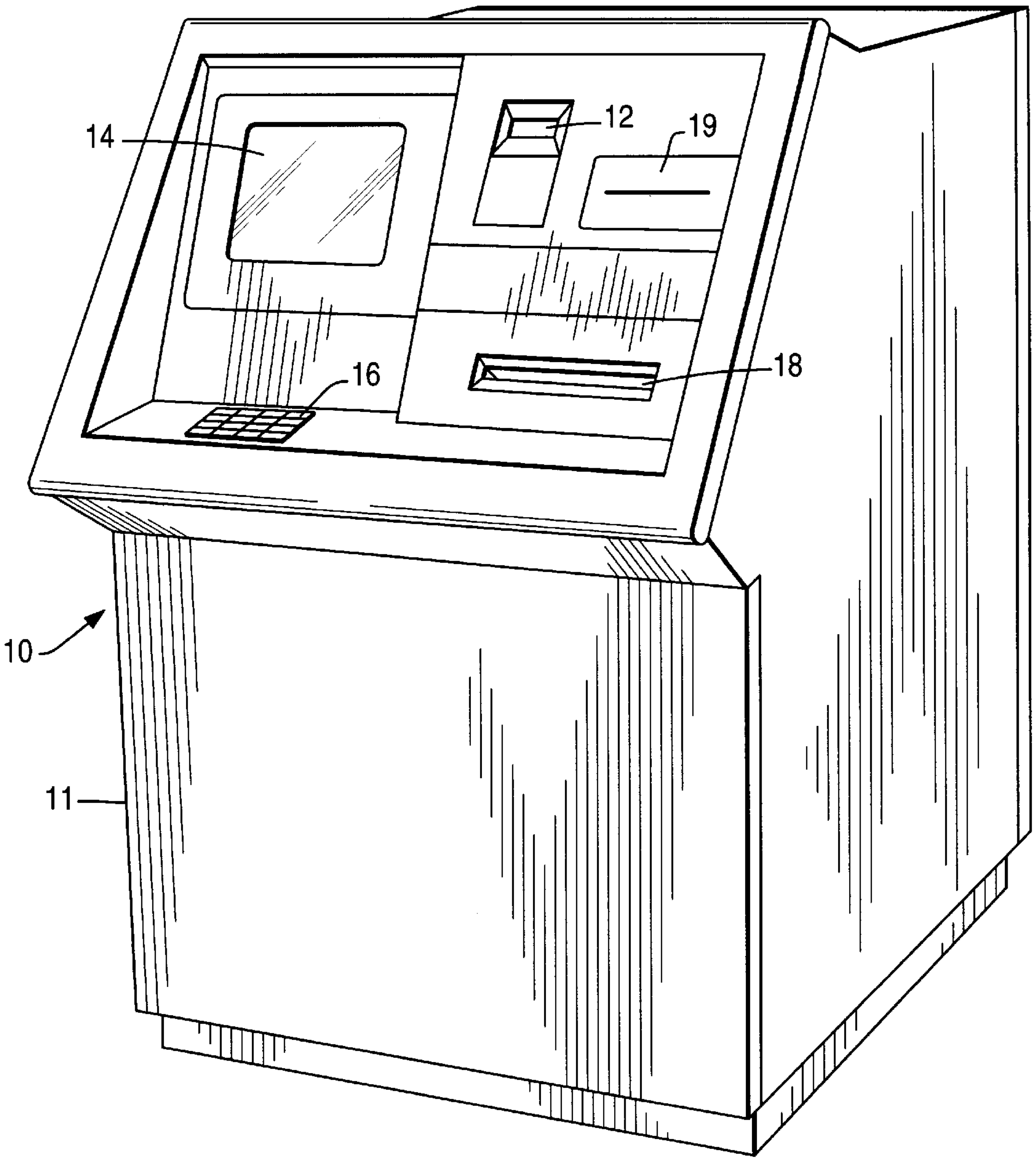
FIG. 1 shows a known ATM station.

In the typical ATM arrangement of FIG. 1, the ATM 10 is enclosed within a cabinet 11 and has customer utilization arrangements such as a magnetic card input slot 12, display screen 14, a keypad 16, a cash delivery slot 18 and a balance and/or payout receipt delivery slot 19.

Figure 2:
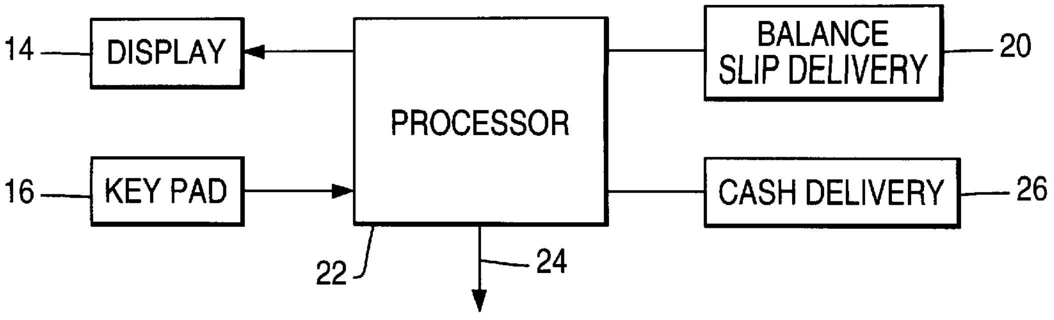
FIG. 2 shows the control system for the FIG. 1 configuration.

The control system for the ATM 10 is shown in FIG. 2 in which a processor 22 is connected to receive the input from the card reader 12 and keypad 16, to control the display 14 and to control a cash counting and delivery system 26 connected to the cash delivery slot 18. A receipt or other paper delivery system 20 is provided for providing a printed receipt, account balance or the like, connected to the delivery slot 19. The processor is connected by a connector 24 to the central authorization system of the financial institution operating the ATM 10.

In an improved arrangement shown in FIG. 3, the ATM now comprises several coupled modules to provide a freestanding island. These include base unit 30, depository and depository envelope dispenser 31, statement printer 32 and secondary dispenser unit 33 (e.g. for additional cash capacity). The base unit and each module has a ruggedized exterior housing 34–37 respectively to allow the arrangement to provide a freestanding walk-up or drive-up ATM system. The base unit 30 is the heart of the system and is a cash dispenser only module with the main processor receiving inputs from card reader 40, keypad 42 and for controlling display 44, cash dispenser 46 and balance slip provider 48. Environmental control is also provided.

The depository module 31 includes a depository slot 50 for envelopes as well as an envelope dispenser slot 51.

The depository module has its own internal safe, separate from the base ATM unit to reduce the exposure to valuables compared to the situation which would occur in the FIG. 1 arrangement when the machine is opened.

The statement printer module 32 includes statement delivery slot 53. The secondary dispenser module 33 allows additional cash provision and has its own safe separate from the base ATM unit to reduce risk exposure. The cash is dispensed through the delivery slot 54. All add-on modules are interchangeable and are attached directly to the base module 30 or linked via an adjacent module to provide a rugged, secure arrangement with abutting modules.

The physical linkage of an add-on module to the base unit is shown in more detail in FIG. 4. The module illustrated is the statement printer module 32 but could be an alternative module. For ease of understanding, the module and base unit are shown prior to bolting together.

The base unit 30 includes upper and lower bolt holes 60, 61 and 62, 63 respectively and removable side plate 65 for environmental control. A removable cable access plate 66 is also provided.

Matching bolt holes 70, 71 and 72, 73 together with plates 75 and 76 are provided to line up with the holes and plates on the base unit. Additional bolt holes (hidden from view) will be provided on the other side face of each housing. Thus the bolt holes provided in both the base unit and the add-on module allows secure bolting together and the removed side plates 65 and 75 allow the flow of air for heating or cooling between the base unit and add-on module. Seals 65*a*, 75*a* are provided around the openings to ensure environmental sealing between modules. Removable plates will be provided on the other (hidden) side face as well.

A cable 80, typically in the form of a wire harness, provides interconnection to the module for operational and power requirements. The cabling can typically be taken to an interfacing connector on the back plate of the unit. In addition, the base unit processor and control system requires sufficient flexibility to handle a number of add-on units and a suitable arrangement is shown in FIG. 5.

The processor 90 has enhanced control not only to deal with the card reader 40, keypad 42, display 44 and cash delivery 46 as well as balance slip provision 48 within its own base unit but also with the operation of the add-on modules. To this end several interface devices 92–94 are connected between the processor 90 and several sockets 96–98. The sockets receive the cabling connected to an appropriate add-on module.

In one embodiment, different socket types can be provided to ensure that only the appropriate add-on unit is plugged into any given socket. In an alternative arrangement, links within the plug from a given module will be connected to identify to the processor which module is uniquely employed, so that identical sockets can be employed. It can also be arranged, under software control, that the processor interrogates an added module to receive a code back from the module indicative of module type.

When additional modules are detected, the processor 90 will reconfigure the display 44 to indicate the range of facilities available. Hence when the additional cash dispenser module 54 is detected to be present, then when the supply of cash from the base ATM unit is exhausted, the processor 90 will instruct the module 54 to commence dispensing of cash in its stead, and to provide appropriate screen displays.

The modular approach with the enhanced processor allows flexibility requirements to be met for depository, additional cash capacity, statement printing, consumables storage and envelope dispensing in any combination to allow the system purchaser to configure their installation to suit usage trends and reduce cost. The arrangement can fit on a 36 inch island.

The modular approach assists in maintenance, repair and replenishment in that the entire machine need not be taken out of service during such periods. Although in the example three add-on modules have been shown, with suitable interfacing additional modules could be included.

What is claimed is:

1. A self service terminal comprising:

a housing;

dispensing means for dispensing at least one item in response to an authorized user request;

the housing and the dispensing means forming a base unit including a control processor; and interfacing means provided on the base unit for interfacing with at least one of several different add-on modular units to provide additional facilities thereto, and including an interface device and cooperating electrical socket, and configured with said processor for specifically identifying respective ones of said different modular units.

2. A self service terminal according to claim 1, further comprising at least one modular unit including a housing and means for securely coupling said housing of said one modular unit to a housing of another modular unit including the housing of the base unit.

3. A self service terminal according to claim 2, wherein (i) the interfacing means further includes an electrical cable interconnecting said one modular unit with said socket, and (ii) the base unit processor is configured to identify and control the at least one modular unit when connected thereto.

4. A self service terminal according to claim 3, further comprising coding means for assisting the processor in identifying the at least one modular unit employed, the processor being configured to modify a display to indicate facilities available.

5. A self service terminal according to claim 2, wherein the interfacing means further includes environmental interfacing means for providing environmental control of the at least one modular unit when securely coupled to the base unit, the environmental interfacing means including first access means for allowing air to be circulated into the at least one modular unit.

6. A self service terminal according to claim 5, wherein the at least one modular unit includes second access means for allowing the environmental interfacing means to provide environmental control of another modular unit.

7. A self service terminal according to claim 6, further comprising sealing means adjacent the first and second access means and for preventing escape of air from coupled housings.

8. A self service terminal according to claim 1, wherein the at least one modular unit includes a security safe for holding cash.

9. A self service terminal comprising:

a housing arrangement including a plurality of different abutting modular units each having a separate housing;

authorizing means for authorizing a user request; and dispensing means for dispensing at least one item in response to an authorized user request, the dispensing means and the authorizing means comprising a base unit to which the modular units are coupled, and said base unit including a control processor operatively joined to a plurality of interface devices and corresponding electrical sockets configured specifically for identifying respective ones of said different modular units, with said sockets having respective cables joined to said modular units.

10. A modularized automated teller machine (ATM) for allowing an ATM customer to carry out a self-service financial transaction, the modularized ATM comprising:

a base unit including (i) a housing, and (ii) a currency dispenser controlled by a processor for dispensing currency in response to an authorized user request; and an interface device and cooperating electrical socket provided on the base unit for interfacing with at least one of several different modular add-on units to provide additional facilities thereto, and configured with said processor for specifically identifying respective ones of said different modular units.

11. An ATM according to claim 10, further comprising at least one add-on unit including a housing and means for securely coupling said housing of said one modular unit to a housing of another modular add-on unit including the housing of the base unit.

12. An ATM according to claim 11, wherein (i) the interface includes an electrical cable interconnecting said one modular unit with said socket, and (ii) the base unit processor is configured to identify and control the at least one modular add-on unit when connected thereto.

13. An ATM according to claim 12, further comprising coding means for assisting the processor in identifying the at least one modular add-on unit employed, the processor being configured to modify a display to indicate facilities available.

14. An ATM according to claim 11, further comprising environmental interfacing means for providing environmental control of the at least one modular add-on unit when securely coupled to the base unit, the environmental interfacing means including first access means for allowing air to be circulated into the at least one modular add-on unit.

15. An ATM according to claim 14, wherein the at least one modular add-on unit includes second access means for allowing the environmental interfacing means to provide environmental control of another modular add-on unit.

16. An ATM according to claim 15, further comprising sealing means adjacent the first and second access means and for preventing escape of air from coupled housings.

17. An ATM according to claim 11, wherein the at least one modular add-on unit includes a security safe for holding cash.

18. An ATM according to claim 11, wherein the at least one modular add-on unit includes a depository envelope dispenser.

19. An ATM according to claim 11, wherein the at least one modular add-on unit includes a statement printer.

20. An ATM according to claim 11, wherein the at least one modular add-on unit includes another currency dispenser.

* * * * *